United States Patent [19]

Rialland et al.

[11] 4,352,828

[45] Oct. 5, 1982

[54] CATION-EXCHANGE OF MILK AND PRODUCTS THEREOF

[75] Inventors: Jean P. Rialland, Retiers; Jean P. Barbier, Noyal-sur-Seiche, both of France

[73] Assignee: Laiteries E. Bridel, Retiers, France

[21] Appl. No.: 251,892

[22] Filed: Apr. 7, 1981

[30] Foreign Application Priority Data

Apr. 17, 1980 [FR] France ............................ 80 08644
Mar. 31, 1981 [FR] France ............................ 81 06470

[51] Int. Cl.³ .................................................. A23C 9/146
[52] U.S. Cl. ................................. 426/271; 260/120; 426/491; 426/580; 426/583; 426/657
[58] Field of Search ............... 426/271, 580, 582, 583, 426/655, 657, 444, 456, 464, 471, 472, 473, 478, 479, 491, 495, 520, 523, 524; 260/112 R, 119, 120; 210/663, 681, 687

[56] References Cited

U.S. PATENT DOCUMENTS

| | | | |
|---|---|---|---|
| 2,990,284 | 6/1961 | Freund et al. | 426/271 |
| 3,008,840 | 11/1961 | Stewart et al. | 426/271 |
| 3,020,161 | 2/1962 | Murthy et al. | 426/271 X |
| 3,089,776 | 5/1963 | Ernstrom | 426/582 X |
| 3,194,663 | 7/1965 | Higgins | 426/271 |
| 3,423,208 | 1/1969 | Kuipers | 426/271 |
| 3,645,751 | 2/1972 | Wakeman | 426/582 |
| 4,138,501 | 2/1979 | Chaveron et al. | 426/271 X |

FOREIGN PATENT DOCUMENTS

| | | | |
|---|---|---|---|
| 4231 | 9/1979 | European Pat. Off. | 426/580 |
| 542846 | 1/1942 | United Kingdom | 426/271 |
| 654384 | 6/1951 | United Kingdom | 426/271 |

OTHER PUBLICATIONS

Hall et al., *Drying of Milk & Milk Products*, 2nd Ed., 1971, pp. 139 & 185.

*Primary Examiner*—Arthur L. Corbin
*Attorney, Agent, or Firm*—Bacon & Thomas

[57] ABSTRACT

Acidulated decationized milk containing the same content of proteins and lactose as ordinary milk and having a pH below or equal to 3.8 is prepared by placing milk in contact with a cation-exchanging resin in acid form, said milk having a temperature varying between 0° and 4° C., for the time period necessary to lower the pH of the said milk to a value below or equal to 3.8, and separating the decationized milk from the exchanging resin. The decationized milk is used to prepare acidified milks, milk casein, milk acid curds and lactoserum.

32 Claims, 1 Drawing Figure

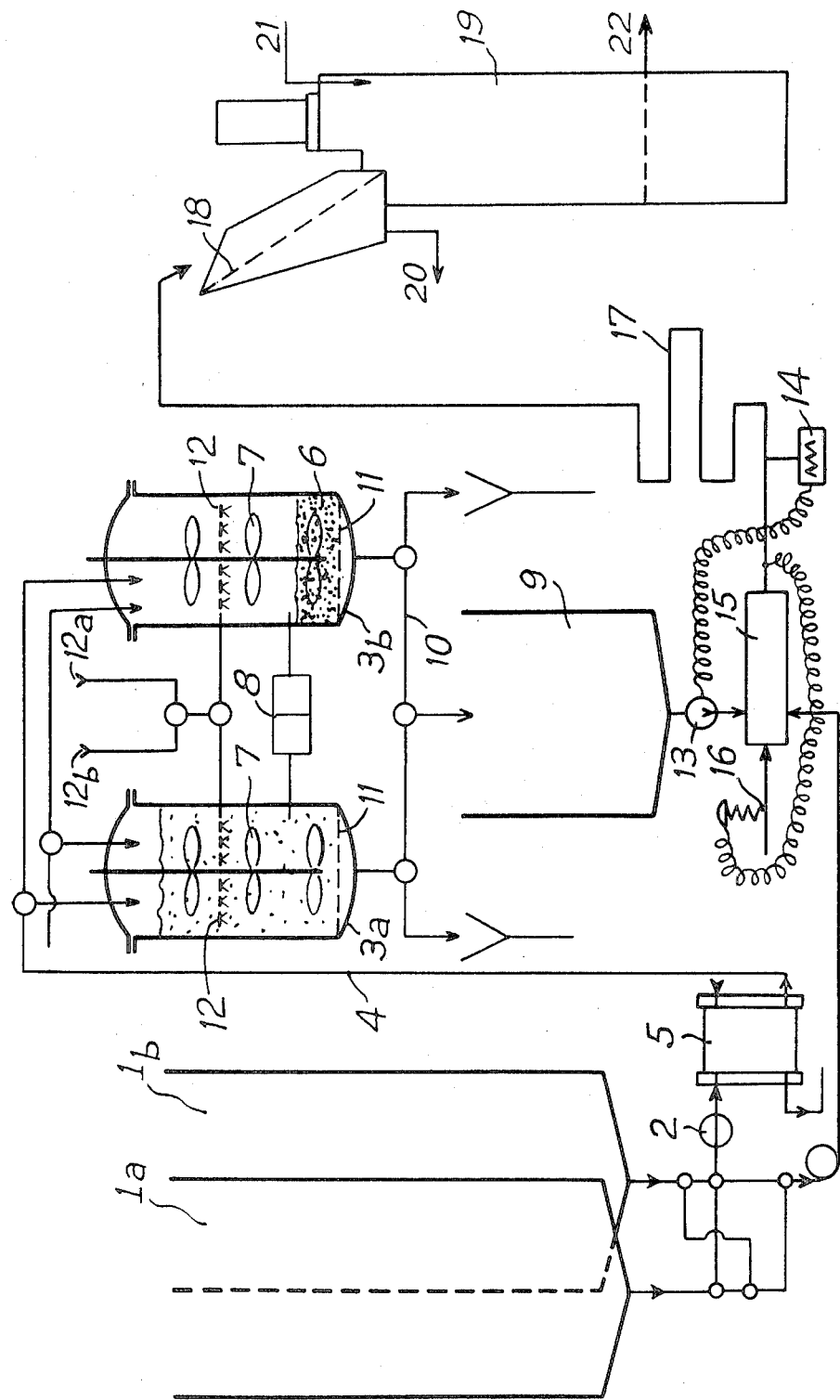

CATION-EXCHANGE OF MILK AND PRODUCTS THEREOF

The conventionally known methods for preparing casein or milk curd for making cheese without rennet involve the coagulation of the casein contained in the milk by lowering the pH of the said milk down to the isoelectric point of casein, which is about pH 4.6. This can be accomplished by the following methods:

(a) By lactic fermentation of the milk, necessitating storing large volumes of milk throughout the whole fermentation, which can take between 12 and 16 hours.

(b) By acidification of the milk through adding a strong mineral or organic acid (such as hydrochloric acid, sulphuric acid, or lactic acid, amongst others), to lower the pH of the said milk down to the isoelectric point of the milk casein, at which point the casein contained in said milk coagulates. This leads to a casein of good quality and also to a high volume of acid and strongly mineralized lactoserum, which is difficult to market as it stands, and mostly requires a further treatment of demineralization by ion-exchange or by electro-dialysis. Moreover, this rough method of treating milk with a strong acid involves the risk of changing the nature of or damage to certain valuable products contained in the milk to be treated. or (c) By passing the milk through a layer of cation exchanging resin in acid form to replace the cations contained in the milk with hydrogen ions and to precipitate the casein of the milk on the particles of said resin, thus giving a good quality casein and a lactoserum with a good food-value; but the precipitation of the casein on the particles of resin causes very rapidly the inactivation of that resin.

In order to overcome these disadvantages, according to a recent method described in the European patent application published under No. 0004231, it has been proposed to operate in two stages:

in the first stage, the milk is placed in contact with a cation-exchanging resin to lower the pH of the milk down to a value higher than the isoelectric point of the milk casein, for example to a pH not less than 4.7 and in particular between 4.9 and 5, so as to avoid any flocculation of the milk casein which could cause particles of exchanging resin being imprisoned by the flocculated casein;

in the second stage, the milk thus treated is acidified by adding in a diluted acid until a pH of 4.6 is reached, which is the isoelectric point of the milk casein, to coagulate the said casein which is extracted.

However, the addition in a second stage of an acid to acidify the milk, besides presenting a great risk of corrosion for the equipment used, also leads to an acid lactoserum which is still strongly mineralized, and therefore requires, to be marketed, a total or partial demineralization which is expensive.

Moreover, according to another method proposed in the French patent application published under No. 2 331 963, the skim milk is concentrated by ultrafiltration to obtain a milk concentrate and a milk ultrafiltrate (or filtration liquid), then the casein from the milk concentrate is precipitated by addition of the ultrafiltrate whose pH was previously lowered by cation exchange to below the normal value of 4.3–4.8, for example to 1 to 2.5. The milk concentrate is a casein and soluble protein-enriched milk (up to 17–19 g for 100 g of milk concentrate against 3 to 3.2 g for 100 g of normal milk).

The milk ultrafiltrate essentially contains the soluble elements from the milk, i.e. the lactose, the soluble mineral salts (0.45–0.48 g for 100 g of ultrafiltrate), and the non-protein nitrogen substances (0.12 g–0.18 g for 100 g of ultrafiltrate). It is a "lactoserum" which is devoid of protein nitrogen substances.

Due to the fact that the milk ultrafiltrate contains no casein or protein nitrogen substances, there is no precipitation of these substances on the particles of cation-exchanging resin during the treatment of the said ultrafiltrate with the cation-exchanging resin.

However, the concentration of the milk by ultrafiltration necessitates the use of a technique demanding high investments and high running costs in order to obtain a milk concentrate which can have the composition of drained cheese and from which cheese can be prepared without having to recourse to the technological stage of draining.

If, in order to coagulate the casein from the milk concentrate, it was necessary to reintroduce therein a large quantity of milk ultrafiltrate (which it has been difficult to be rid of) after lowering its pH with a cation-exchanging resin, all the advantages that could be expected from a concentration by ultra-filtration would then be nil.

Moreover, the casein yield with respect to the weight of liquids used (milk concentrate+milk ultrafiltrate) is poor considering that the volume of liquids used is more than double the volume of milk concentrate and that only the milk concentrate contains the casein to be coagulated.

Now, the inventors have noted that it would be possible, by placing milk in contact with a cation-exchanging resin in acid form, to lower the pH of the milk down to the isoelectric point of the milk casein (pH 4.6) or to below the said point, without causing the coagulation of the casein contained in that milk, if the milk and cation-exchanging resin mixture is kept within a range of low temperatures, between 0° and 4° C., whereas at normal temperature or at fairly high temperatures, the milk casein coagulates as soon as the isoelectric point of the casein is reached.

The inventors have also discovered that by lowering the pH of the milk down to a pH lower or equal to 3.8, operating within the range of tempertures going from 0° to 4° C., and using cation-exchanging resins in acid form, a "decationized" milk is obtained, i.e. a milk mostly cleared from calcium, sodium, potassium cations, and with a mineral element content less than 4 g/liter, with a Ca/P ratio less than 0.5 and a pH below or equal to 3.8, that is to say clearly less than the isoelectric point of the casein (whereas the pH of normal milk is 6.7), and containing all the protein nitrogenous substances and all the lactose of normal milk. This acidulated decationized milk has the special characteristic of being preservable without any particular precautions for several days at a temperature higher than 4° C., for example at normal temperature (it needs not therefore be preserved at 0°–4° C.) without the casein contained therein coagulating or germs forming.

It can also be advantageous to use this acidulated decationized milk to acidify ordinary milk and to bring it to the required pH.

In particular, it can be used to sparingly acidify non-treated milk and to bring the pH of both milks to the isoelectric point of the milk casein in order to bring about the coagulation of the casein contained both in one and in the other milk and to obtain an acid casein or an acid curd for making cheese without rennet and lactoserum, this being a considerable advantage from the economical standpoint since the treatment with the cation-exchanging resin can be limited to a fraction only of the amount of milk intended for the preparation of the casein or of the curd.

The object of the present invention is therefore to propose a milk processing method, using a cation-exchanging resin in acid form, with a view to preparing an acidulated decationized milk, without the addition of any strong mineral or organic acid; this method consists in placing the milk in contact with the cation-exchanging resin in acid form at a temperature which can vary between 0° and 4° C., and preferably between 0° and 2° C., for the period necessary to lower the pH of the said milk to a value below or equal to 3.8, and preferably between 1.5 and 3.5, and in separating the resulting acidulated decationized milk from the exchanging resin.

A contact period of between 1 and 10 minutes is generally sufficient to reach the required pH. This contact period can be further reduced if the milk and resin are stirred. The volume ratio of the milk treated to the exchanging resin is preferably between 5:1 and 15:1.

Conventional-type cation-exchanging resins in acid form, such as used in the normal demineralization processes can be used as exchanging resin, including those used for the demineralization of whey.

It is for example possible, according to the invention, to use strongly acid cation-exchanging resins with polystyrene skeleton, carrying sulfonic acid groups, presented in gel or macroporous solid form (such as small balls, small sticks, etc).

Macroporous type resins are preferred to gel type resins because of their greater mechanical strength.

Strongly acid cationic resins with polystyrene skeleton carrying sulfonic acid groups are commercialized under the following trademarks:
  "Duolite" By Diaprosim-Diamond
  "Amberlite" by Rohm and Haas
  "Lewatit" by Bayer
  "Kastel" by Montedison
  "Dowex" by Dow Chemical
  "Relite" by Residion
  "Zerolit" by Permutit The following strongly acid cationic resins with macroporous structure are preferred:
  "Duolite C 26" (styrene divinylbenzene-copolymer with sulfonic acid groups; small balls of granulometry 0.3 to 1.2 mm; apparent density 0.85 kg/l).
  "Amberlite 200" and "Amberlite 252" (styrene divinylbenzene-copolymer with sulfonic acid groups; apparent density 0.80 kg/l; granulometry 0.4–0.5 mm).
  "Lewatit SP 112" (polystyrene with sulfonic acid groups; small balls of granulometry 0.3–1.5 mm; apparent density 0.70–0.80 kg/l).
  "Kastel C 300 P" and "Kastel 300 AGRP" (styrene divinylbenzene-copolymer with sulfonic acid groups; small balls of granulometry 0.3–1.2 mm; apparent density 0.84–0.86 kg/l).
  "Dowex MSC-1" (sulfonated-styrenedivinyl-benzene-copolymer; small balls of granulometry 0.29–0.84 mm; apparent density 0.80 kg/l).

The milk treated with a cation-exchanging resin is an acidulated "decationized" milk (i.e. a milk containing only traces of calcium, sodium, potassium cations), with a pH which is below or equal to 3.8, therefore clearly below the isoelectric point of casein (whereas ordinary milk has a pH of about 6.7), and containing all the proteins and the lactose of ordinary milk.

Its mineral element content is less than 4 g/l; the Ca/P ratio is below 0.5 (against 1.3 for ordinary milk).

The treatment of milk with a cation-exchanging resin can be conducted by techniques known per se, either by percolating the milk through a fixed bed of cation-exchanging resins, or by counter-current flow of the milk with the cation-exchanging resin, or else by mechanical or pneumatic agitation of the mixture of milk and cation-exchanging resin, or by any other appropriate means.

After saturation of the cation-exchanging resin by the cations of the milk, the said exchanging resin is regenerated by an acid. The regenerated exchanging resin is then rinsed with decationized water, and it is ready for a new cycle of treatment.

A further object of the present invention is to use the acidulated decationized milk according to the invention to acidify milk with a view to preparing acidified milks, casein, acid curd for making cheese without rennet, and lactoserum.

To prepare acidified milks, the acidulated decationized milk is mixed with ordinary milk until the required pH is reached.

To prepare milk casein and lactoserum, the acidulated decationized milk is mixed with a quantity of non-treated ordinary milk, sufficient to raise the pH of the mixture to around the isoelectric point of the milk casein, and the resulting mixture is heated up to a temperature of between 10° and 60° C. to coagulate the casein contained both in the treated and in the non-treated milk, and the coagulated casein is separated as well as the lactoserum.

More particularly, the acidulated decationized milk is mixed with a certain volume of nontreated ordinary milk, (preferably a volume equal to that of the decationized milk) to raise the pH of the mixture to a pH of between 4.4 and 4.6 and the resulting mixture is then heated to a temperature of 40° to 50° C. to coagulate the casein contained in said mixture.

The coagulated casein is separated from the lactoserum, then it is washed and dried according to the conventional methods (spray drying, or drying by hot air in fluidized bed), or it is converted into alkaline or alkaline-earth metal caseinates (sodium, potassium, calcium) or into ammonium caseinates.

The extracted lactoserum (which contains only those cations brought by the non-treated milk) can then be dried as it stands or after neutralizing or it can be subjected to any normal technological operation such as demineralization, ultra-filtration, concentration by reverse osmosis.

The lactoserum obtained according to the present invention has a low mineralization and the ratios of the different mineral elements, although they are quite close to those of the starting milk, have the following characteristics:

|  | Ordinary milk | sweet lactoserum | acid lactoserum | lactoserum according to the invention |
|---|---|---|---|---|
| $\frac{Ca}{P}$ | >1 | ≧1 | ≧1.5 | <1 |

-continued

|  | Ordinary milk | sweet lactoserum | acid lactoserum | lactoserum according to the invention |
|---|---|---|---|---|
| $\frac{K}{P}$ | $\geq 1.5$ | $\geq 2.5$ | $> 2.0$ | $< 1.3$ |
| $\frac{P}{Cl}$ | $\leq 0.85$ | $\leq 0.6$ | $\leq 0.3$ | $\geq 0.6$ |

It is a remarkable fact that this lactoserum, whether concentrated by ultrafiltration or not, shows good expanding properties, better in any case than those of a casein lactoserum obtained by direct acidification, as much in the volume after churning as in the texture.

Moreover, when using the acidulated decationized milk according to the invention in the preparation of acid curd for making cheese without rennet, such as cottage cheese, the acidulated decationized milk is mixed with non-treated ordinary milk in sufficient quantity to bring up the pH of the mixture to around the isoelectric point of the milk casein, the resulting mixture is heated up to a temperature of between 10° and 60° C. to coagulate into curd form the casein contained both in the acidulated decationized milk and in the non-treated ordinary milk, the curd that has formed is cut and baked at a temperature varying between 48° and 60° C., the lactoserum is drained and extracted, and the curd is washed in cold water and thoroughly drained.

More particularly, the acidulated decationized milk is mixed with a sufficient quantity of non-treated ordinary milk (preferably a volume equal to that of the decationized milk), after being cooled to a temperature varying between 0° and 4° C., to raise the pH of the mixture to a value varying between 4.4 and 4.8, and preferably between 4.4 and 4.6, and then the mixture is heated up to a temperature of between 30° and 35° C. to coagulate the curd.

It is thus possible with the aforedescribed method according to the invention, to prepare cheese of the following types: cottage cheese, queso blanco, quark, cheddar-like cheese, Rocotta cheese, Blue cheese, and cheese for pizzas.

The invention will now be described with reference to the appended drawing in which the one and only FIGURE diagrammatically illustrates an industrial installation to carry out the method according to the invention.

Referring to that FIGURE, skim milk is stored in two vats (1a) and (1b). The milk from one of these vats is conveyed via a pump (2) in one of two reactors (3a) or (3b) via conduit (4) after cooling down to a temperature below 4° C. in the heat exchanger (5) by a cryogenic liquid. In the reactor (3a) or (3b) the milk is placed in contact with a strongly acid cationic resin (6) (in small ball form) under adequate agitation created by agitators (7) to keep the small balls of resin in suspension in the milk. When the pH measured with a pH meter (8) reaches the required value (generally 3.5), the acidulated decationized milk is transferred to the storing container (9) by simple gravity or by air pressure, via the conduit 10; the balls of resin are held back in the reactor (3a) or (3b) by a sieve (11) placed at the lower part of the reactor. After rinsing the milk held back between the balls of resin in the water admitted at 12a, said balls are regenerated by a diluted solution of hydrochloric acid introduced in 12b, and rinsed in water through a dispersal ramp (12). Throughout this regeneration, the milk is treated in the second reactor.

The acidulated decationized milk stored in the storage tank (9) is mixed in the coagulation head (15) with the non-treated milk stored in the vat (1a) or (1b), if necessary after cooling in the heat exchanger 5, in a proportion such that the pH is between 4.4 and 4.6. The volume of decationized milk is delivered as a function of the pH requirement by a variable-delivery pump (13) under the control of the pHmeter (14). The coagulation occurs in the coagulation head (15) by direct injection of steam regulated in 16. After the mixture has been left standing in (17), to cool down to ambient temperature, the product obtained is extracted. To prepare the casein, the curds are separated from the lactoserum by means of a filter (18) placed at the inlet to a first washing tank (19). The lactoserum is collected at 20, for subsequent treatment whereas the curds are washed with the water brought through 21 and emptied through a conduit (22) towards a second washing tank not shown.

The following examples are given to illustrate the method according to the invention performed in the installation described hereinabove.

EXAMPLE 1

Preparation of decationized milk.

10 volumes of skim milk cooled down to 2° C. are mixed under stirring with a volume of strongly acid cation-exchanging resin (H+form) marketed under the tradename of "Duolite C 26" (sulfonated styrene-divinylbenzene-copolymer, with macroporous structure), presented in the form of balls of 0.3 to 1.2 mm. After five minutes, the milk is separated from the resin, which is washed in water and regenerated by a solution of hydrochloric acid at 10%, the decationized milk obtained this way is then analyzed and is composed as follows:

| Composition | Starting milk | Decationized milk |
|---|---|---|
| dry substance, g/l | 92.3 | 84.5 |
| Total nitrogen substance, g/l | 34.8 | 32.0 |
| Casein, g/l | 27.2 | 26.3 |
| Minerals, g/l | 7.9 | 3.2 |
| pH | 6.7 | 2.3 |
| Calcium, g/l | 1.15 | 0.15 |
| Potassium, g/l | 1.48 | traces |
| Sodium, g/l | 0.45 | traces |
| Chlorides, g/l | 2.15 | 1.8 |
| Phosphorus, g/l | 1.05 | 1 |

The decationized milk is characterized by a much reduced content in mineral substances and a pH clearly under the isoelectric point of the milk casein (3.2 g/l of mineral substances against 7.9 g/l for the starting milk; pH 2.3 against pH 6.7 for the starting milk).

The decationized milk no longer has the white color and the opacity of ordinary milk; it resembles a translucid greenish yellow liquid.

This decationized milk shows no visible deposit after a 48-hour storage at room temperature.

Preparation of casein 10 volumes of non-treated skim milk are mixed with the decationized milk obtained as indicated above. As soon as the pH of the mixture has reached the value 4.4 to 4.6, the mixture is heated up to 45° C. by direct injection of steam to coagulate the milk casein. The curds are separated from the lactoserum by filtration. After washing in water, the curds are drained and suspended in water at 75° C. and neutralized by a 10% aqueous solution of NaOH, until a final pH of 6.6 is reached. The resulting caseinate solution is free of all impurities. After spray drying, a white powder of sodium caseinate is obtained, the flavor of which is neutral and natural. The washed curds and the sodium caseinate are analyzed as well as the lactoserum extracted.

| Compositions | Casein Lactoserum | Washed curds | Powdered caseinate (by weight) |
|---|---|---|---|
| Dry substance | 63 g/l | 45% | 95.5% |
| Total nitrogen substances | 7.25 g/l | 43.6% | 89.8% |
| Minerals | 4.65 g/l | 0.9% | 3.6% |
| pH | 4.5 | | 6.6 |
| Calcium | 0.68 g/l | | |
| Potassium | 0.75 g/l | | |
| Sodium | 0.23 g/l | | |
| Chlorides | 1.85 g/l | | 1.3% |
| Lactose | | 0.1% | 0.2% |
| Phosphorus | 0.85 g/l | | |

EXAMPLE 2

Preparation of decationized milk.

1 volume of cationic resin in H+ form "Duolite C 26" (cationic resin with polystyrene skeleton with sulfonic functional groups, in the form of small balls of 0.3 to 1.2 mm), is placed in a double-wall column, thermostated at 2° C.; 10 volumes of milk cooled down to 2° C. are decationized by being sent at countercurrent through the resin, at the rate of 5 volumes per hour. The decationized milk is recovered and its analysis gives the following composition:

| Composition | Starting milk | Decationized milk |
|---|---|---|
| Dry substance g/l | 92.1 | 84.0 |
| Total nitrogen substances g/l | 34.6 | 32.1 |
| Casein g/l | 27.0 | 26.1 |
| Minerals g/l | 8.25 | 3.5 |
| pH | 6.7 | 2.4 |
| Calcium g/l | 1.15 | 0.12 |
| Potassium g/l | 1.50 | traces |
| Sodium g/l | 0.48 | traces |
| Phosphorus g/l | 1.05 | 0.95 |

The decationized milk is characterized by a reduced content of mineral substances (3.5 g/l against 8.25 g/l in the non-treated milk) and by a pH that is below the isoelectric point of the milk casein (pH 2.4 against pH 6.7 for the non-treated milk).

Preparation of casein 1 volume of decationized milk is mixed with 1 volume of non-treated milk. The pH of the mixture is 4.5. Said mixture is heated up to between 30° and 60° C. (50° C. for example) to agglomerate the casein. The curds are separated from the lactoserum and then washed and drained.

10 liters of non-treated milk and 10 liters of decationized milk have given 1.600 kg of curds of the following composition; the composition of the lactoserum recovered is also given hereunder as well as the composition of a serum obtained from the conventional production of casein by acidification with hydrochloric acid, given for comparison purposes:

| Composition | Washed curds | Lactoserum | Hydrochloric Serum |
|---|---|---|---|
| Dry substance | 35% | 64 g/l | 60–65 g/l |
| Nitrogen substance | 33.3% | | |
| Total nitrogen substances/dry Substance | 95% | 11.6% | 10.5–11.5% |
| Ashes/dry substance | 2.5% | 7.25% | 10.5–12% |
| Lactose | 0.25% | | |
| Fat content | 0.50% | | |
| Chlorides/dry substance (in NaCl) | | 2.9% | 7–7.5% |
| Calcium/dry substance | | 1.2% | 1.6–2% |
| Potassium/dry substance | | 1.65% | 2.4–2.6% |
| Sodium/dry substance | | 0.55% | 0.7–0.9% |
| pH | | 4.5 | 4.4–4.6 |
| Phosphorus/dry substance | | 1.3% | 1–1.3% |

The casein yield at 10% water per 100 liters of milk is 3.1 kg; the yield in liters of milk per Kg of casein at 10% water is 32.

The lactoserum obtained shows a low mineralization (7.25% ashes against 10.5–12% for the hydrochloric serum) with in particular a low content of chlorides (2.9% of chlorides against 7–7.5% for the hydrochloric serum).

EXAMPLE 3

Preparation of decationized milk 1 volume of cationic resin in form H+ "Duolite C 26" is placed in a double-wall column, thermostated at 2° C.; 10 volumes of milk cooled down to 2° C. are decationized by being sent at countercurrent through the resin at the rate of 5 volumes per hour. The decationized milk is recovered. An analysis of this milk gives the following composition:

| | Starting milk | Decationized milk |
|---|---|---|
| Dry substance g/l | 92.6 | 84.4 |
| Total nitrogen substances g/l | 35.1 | 31.6 |
| Casein, g/l | 27.2 | 25.5 |
| Minerals, g/l | 7.7 | 3.1 |
| pH | 6.7 | 2.2 |
| Calcium, g/l | 1.17 | 0.24 |
| Potassium, g/l | 1.51 | 0.03 |
| Sodium g/l | 0.44 | traces |
| Phosphorus g/l | 1.02 | 0.96 |

This decationized milk is characterized by a reduced content of mineral substances (3.1 g/l against 7.7 g/l for the non-treated milk) by a pH less than the isoelectric point of the milk casein (pH 2.2 against pH 6.7 for non-treated milk).

Preparation of casein 1 volume of decationized milk is mixed with 1 volume of non-treated milk to bring the pH of the mixture to 4.4. Said mixture is then heated up to 45° C. to coagulate the casein.

The curds are separated from the lactoserum and then washed and drained.

The extracted lactoserum is analyzed and compared with a serum obtained from the conventional preparation of casein by acidification of the milk with hydrochloric acid.

| Composition | Hydrochloric serum | Lactoserum extracted |
|---|---|---|
| Dry substance, g/l | 60–65 | 63.5 |
| Nitrogen substance/dry substance % | 10.5–11.5 | 11.2 |
| pH | 4.4–4.6 | 4.4 |
| Ashes/dry substance % | 10.5–12 | 7.65 |
| Chlorides/dry substance(in NaCl) % | 7.0–7.5 | 2.85 |
| Calcium/dry substance % | 1.6–2.0 | 1.24 |
| Potassium/dry substance % | 2.4–2.6 | 1.16 |
| Sodium/dry substance % | 0.7–0.9 | 0.35 |
| Phosphorus/dry substance | 1–1.3 | 1.35 |

The extracted lactoserum has a low rate of mineralization (7.65% ashes against 10.5–12% for the hydrochloric serum) and it contains only few chloride ions (2.85% of chlorides against 7 to 7.5% for the hydrochloric serum).

EXAMPLE 4

Preparation of the neutralized lactoserum

The lactoserums obtained in the preceding examples are neutralized in order to bring their pH to around 5.5 to 6.5. The composition of these neutralized serums is given hereunder:

| | Serum of Ex. 1 neutralized by | | Serum of Ex. 3 neutralized by | | |
|---|---|---|---|---|---|
| | Ca(OH)$_2$ and NaOH | Ca(OH)$_2$ | KOH | NaOH | NaOH |
| Dry substance g/l | 61.0 | 61.7 | 60.8 | 62.9 | 62.7 |
| Total nitrogen substance dry substance % | 11.6 | 11.5 | 11.5 | 10.1 | 10.5 |
| Minerals/dry substance % | 9.0 | 8.8 | 9.3 | 8.2 | 9.1 |
| pH | 6.15 | 6.0 | 6.2 | 5.8 | 6.4 |
| Acidity° dornic | 22 | 25 | 20 | 29 | 18 |
| Chloride/dry substance % | 2.95 | 2.95 | 2.95 | 2.9 | 2.9 |
| Calcium/dry substance % | 1.65 | 1.80 | 1.25 | 1.33 | 1.32 |
| Potassium/dry substance % | 1.31 | 1.30 | 2.25 | 1.40 | 1.40 |
| Sodium/dry substance % | 0.68 | 0.45 | 0.47 | 0.90 | 1.20 |

EXAMPLE 5

Preparation of cheese without rennet.

Preparation of decationized milk 1000 liters of pasteurized skim milk, cooled down to 2° C., are mixed under stirring with 100 liters of strongly acid (H+ form) cation-exchanging resin marketed under the tradename "Duolite C 26" (sulfonated styrene divinylbenzene-copolymer, with macroporous structure) presented in the form of small balls of 0.3 to 1.2 mm. After five minutes, the milk is separated from the resin, which latter is washed in water and regenerated with a solution of hydrochloric acid at 10%; the decationized milk obtained this way is analyzed and has the following composition:

| Composition | Starting milk | Decationized milk |
|---|---|---|
| Dry substances, g/l | 92.5 | 84.8 |
| Total nitrogen substances, g/l | 34.9 | 32.2 |
| Casein, g/l | 27.3 | 26.5 |
| Minerals, g/l | 7.9 | 3.2 |
| pH | 6.65 | 2.4 |
| Calcium, g/l | 1.2 | 0.15 |
| Potassium, g/l | 1.5 | traces |
| Sodium, g/l | 0.45 | traces |
| Chlorides, g/l | 2.15 | 1.85 |
| Phosporus, g/l | 1.05 | 1.0 |

The decationized milk is characterized by a much reduced content of mineral substances and a pH which is clearly below the isoelectric point of the milk casein (3.2 g/l of mineral substances against 7.9 g/l in the starting milk; pH of 2.4 against 6.65 for the starting milk).

The decationized milk no longer has the white color and the opacity of ordinary milk; it resembles a translucid greenish yellow liquid.

Said decationized milk shows no visible deposit after a 48-hour storage at room temperature.

Preparation of drained acid curd 1000 liters of pasteurized skim milk cooled down to 2° C. are mixed with the decationized milk obtained above.

The pH reaches a value varying between 4.4 and 4.5. The mixture is heated slowly to 32° C. to obtain the coagulation of the milk proteins in curd form.

As soon as the curd obtained reaches the suitable firmness, it is cut. The cut curd is left to stand for about 15 minutes and it is then baked. The curd is heated slowly up to a temperature of between 52° and 55° C. and is kept for about an hour at that temperature, until the curd shows the required firmness.

After extraction of the lactoserum, the curd is washed and cooled with chlorinated water (10 mg/liter of free chlorine) acidified to a pH of 5.0, and then drained; the washing and draining operations are repeated several times, ending up with iced water (between 4° and 5° C.).

The curd is thoroughly drained once more to eliminate any excess water.

Preparation of the cheese

The drained curd can be packed with or without salt or can be creamed and salted in manner known per se.

The product obtained has the texture and taste of traditional cheeses of the cottage cheese type.

| Composition of the cheese obtained by the method according to the invention: | |
|---|---|
| Dry extract | 22% |
| Proteins | 96.00% with respect to the dry extract |
| Mineral substances | 2.75% with respect to the dry extract |
| Fat content | 0.75% with respect to the dry extract |
| Lactose | 0.50% with respect to the dry extract |

| Composition of the lactoserum | Control lactoserum obtained by acidification with |
|---|---|

-continued

| Composition of the cheese obtained by the method according to the invention: | | |
|---|---|---|
| obtained by the method of the invention | hydrochloric acid by the conventional route | |
| Dry substances | 64.75 g/l | 69.30 g/l |
| Nitrogen substances | 12.57% | 12.48% with respect to the dry substance. |
| NaCl | 2.90% | 6.86% with respect to the dry substance. |
| Ashes | 72.% | 11.00% with respect to the dry substance. |
| Calcium | 1.25% | 1.82% with respect to the dry substance. |
| Potassium | 1.46% | 2.40% with respect to the dry substance. |
| Sodium | 0.46% | 0.75% with respect to the dry substance. |
| Magnesium | 0.13% | 0.17% with respect to the dry substance. |

What is claimed is:

1. Milk processing method using a cation-exchanging resin in acid form for preparing an acidulated decationized milk, wherein said method comprises placing the milk, having a temperature of 0° C. to 4° C., in contact with the cation-exchanging resin in acid form for the time period necessary to lower the pH of the milk to a value below or equal to 3.8, and then separating decationized milk from the exchanging resin.

2. Method as claimed in claim 1, wherein the milk is placed in contact with the cation-exchanging resin for the time period necessary to lower the pH of the milk to between 1.5 and 3.5.

3. Acidulated decationized milk obtained by the method claimed in claim 2 wherein the resin is a strongly acid cation-exchanging resin, with polystyrene skeleton, carrying sulfonic acid groups and having a gel or macroporous structure.

4. Method as claimed in claim 1 or 2, wherein the resin is strongly acid cation-exchanging resin, with polystyrene skeleton, carrying sulfonic acid groups and having a gel or macroporous structure.

5. Method as claimed in claim 1, wherein the volume ratio of the treated milk to the exchanging resin is between 5:1 and 15:1.

6. Method as claimed in claim 1, wherein the milk is at a temperature of between 0° C. and 2° C. when placed in contact with the cation-exchanging resin.

7. Method as claimed in claim 1, wherein the milk being treated is skim milk.

8. Acidulated decationized milk obtained by the method claimed in any one of claims 1, 2, 5, 6 or 7.

9. Acidulated decationized milk obtained by the method claimed in claim 1 wherein the resin is a strongly acid cation-exchanging resin, with polystyrene skeleton, carrying sulfonic acid groups and having a gel or macroporous structure.

10. Milk processing method using a cation-exchanging resin in acid form for preparing casein and lactoserum, wherein said method comprises the steps of:
(a) placing milk, having a temperature of 0° C. to 4° C., in contact with the cation-exchanging resin in acid form for the time period necessary to lower the pH of the milk to a value below or equal to 3.8, and then separating decationized milk from the exchanging resin;
(b) mixing the decationized milk with a quantity of non-treated ordinary milk sufficient to raise the pH of the mixture to around the isoelectric point of the milk casein, heating the resulting mixture to a temperature of between 10° and 60° C. to coagulate the casein contained both in the treated milk and in the non-treated milk and to form lactoserum, separating the coagulated casein from the lactoserum and recovering said lactoserum.

11. Method as claimed in claim 10, wherein the decationized milk is mixed with enough non-treated ordinary milk to raise the pH of the mixture to between 4.4 and 4.6.

12. Method as claimed in claim 10 or 11, wherein the mixture is heated to between 40° and 50° C. to coagulate the casein.

13. Method as claimed in claim 10 or 11, wherein the volume ratio of non-treated milk to decationized milk is about 1:1.

14. Method as claimed in claim 10, wherein the milk is placed in contact with the cation-exchanging resin for the time period necessary to lower the pH of the milk to between 1.5 and 3.5.

15. Method as claimed in claim 10, wherein the resin is a strongly acid cation-exchanging resin, with polystyrene skeleton, carrying sulfonic acid groups and having a gel or macroporous structure.

16. Method as claimed in claim 10, wherein the volume ratio of the treated milk to the exchanging resin is between 5:1 and 15:1.

17. Method as claimed in claim 10 wherein the milk is at a temperature of between 0° C. and 2° C. when placed in contact with the cation-exchanging resin.

18. Method as claimed in claim 10, wherein the milk being treated is skim milk.

19. Milk casein obtained by the method claimed in any one of claims 10, 11, 14, 16, 17 and 18.

20. Lactoserum obtained by the method claimed in one of claims 10, 11, 14, 16, 17 or 18.

21. Milk processing method using a cation-exchanging resin in acid form to prepare acid curds, for making cheese without rennet, and lactoserum, wherein said method comprises the steps of:
(a) placing milk, having a temperature of 0° C. to 4° C., in contact with the cation-exchanging resin in acid form for the time period necessary to lower the pH of the milk to a value below or equal to 3.8, and then separating the decationized milk from the exchanging resin;
(b) mixing the decationized milk with non-treated ordinary milk in sufficient quantity to raise the pH of the mixture to around the isoelectric point of the milk casein;
(c) heating the resulting mixture to a temperature of between 10° and 60° C. to coagulate into curd the casein contained both in the acidulated decationized milk and in the non-treated milk and to form lactoserum, and
(d) cutting the curd which has formed and baking it at a temperature of between 48° and 50° C., and separating the lactoserum from the curd, washing the curd in cold water and then draining the curd.

22. Method as claimed in claim 21, wherein the non-treated ordinary milk is cooled to a temperature of between 0° and 4° C. before said mixing.

23. Method as claimed in claim 21 or 22, wherein the decationized milk is mixed with enough non-treated ordinary milk to raise the pH of the mixture to a value of 4.4 to 4.8.

24. Method as claimed in claim 21 or 22, wherein the mixture of decationized milk and non-treated milk is heated to a temperature of between 30° and 35° C. to coagulate the casein into curd.

25. Method as claimed in claim 21 or 22, wherein the volume ratio of non-treated milk to decationized milk is about 1:1.

26. Method as claimed in claim 21, wherein the milk is placed in contact with the cation-exchanging resin for the time period necessary to lower the pH of the milk to between 1.5 and 3.5.

27. Method as claimed in claim 21, wherein the resin is a strongly acid cation-exchanging resin, with polystyrene skeleton, carrying sulfonic acid groups and having a gel or macroporous structure.

28. Method as claimed in claim 21, wherein the volume ratio of the treated milk to the exchanging resin is between 5:1 and 15:1.

29. Method as claimed in claim 21, wherein the milk is at a temperature of between 0° C. and 2° C. when placed in contact with the cation-exchanging resin.

30. Method as claimed in claim 21, wherein the milk being treated is skim milk.

31. Milk acid curd obtained by the method claimed in one of claims 21, 22, 26, 28, 29 or 30.

32. Lactoserum obtained by the method claimed in claim 21.

* * * * *